(12) United States Patent
Marcacci

(10) Patent No.: US 7,562,885 B2
(45) Date of Patent: Jul. 21, 2009

(54) FOUR-WHEELED VEHICLE

(75) Inventor: Maurizio Marcacci, Leghorn (IT)

(73) Assignee: Piaggio & C. S.p.A., Pontedera, Pisa (IT)

( * ) Notice: Subject to any disclaimer, the term of this patent is extended or adjusted under 35 U.S.C. 154(b) by 284 days.

(21) Appl. No.: 10/576,502

(22) PCT Filed: Dec. 20, 2004

(86) PCT No.: PCT/EP2004/014578

§ 371 (c)(1),
(2), (4) Date: Apr. 18, 2006

(87) PCT Pub. No.: WO2005/058680

PCT Pub. Date: Jun. 30, 2005

(65) Prior Publication Data

US 2007/0029751 A1    Feb. 8, 2007

(30) Foreign Application Priority Data

Dec. 19, 2003   (IT)   .......................... MI2003A2532
Dec. 6, 2004    (IT)   .......................... MI2004A2341

(51) Int. Cl.
*B60G 21/00*   (2006.01)
*B62D 9/02*    (2006.01)

(52) U.S. Cl. .................. 280/124.103; 280/124.135; 280/124.145

(58) Field of Classification Search .......... 280/124.125, 280/124.103, 124.134, 124.135, 124.145
See application file for complete search history.

(56) References Cited

U.S. PATENT DOCUMENTS

| | | | | |
|---|---|---|---|---|
| 4,360,224 A | * | 11/1982 | Sato et al. ................... | 280/269 |
| 4,657,271 A | * | 4/1987 | Salmon ............... | 280/124.139 |
| 4,659,106 A | * | 4/1987 | Fujita et al. ........... | 280/124.103 |
| 6,286,846 B1 | * | 9/2001 | Apariclo et al. ........ | 280/124.11 |
| 6,467,783 B1 | * | 10/2002 | Blondelet et al. ..... | 280/124.106 |
| 2002/0190494 A1 | * | 12/2002 | Cocco et al. .......... | 280/124.135 |
| 2005/0110264 A1 | * | 5/2005 | Seki et al. ................... | 280/788 |

FOREIGN PATENT DOCUMENTS

DE    20101192 U1  *  5/2001
GB    2279047 A    *  12/1994

* cited by examiner

*Primary Examiner*—Paul N. Dickson
*Assistant Examiner*—Drew J. Brown
(74) *Attorney, Agent, or Firm*—James V. Costigan; Hedman & Costigan, P.C.

(57) ABSTRACT

Four-wheeled vehicle (1) of the type equipped with two steered front wheels (2, 3), a frame (13), handlebars (16), two rear wheels (4, 5) and a front suspension group (6) that acts upon the two front wheels (2, 3). The front suspension group (6) allows the rolling of the vehicle (1).

6 Claims, 8 Drawing Sheets

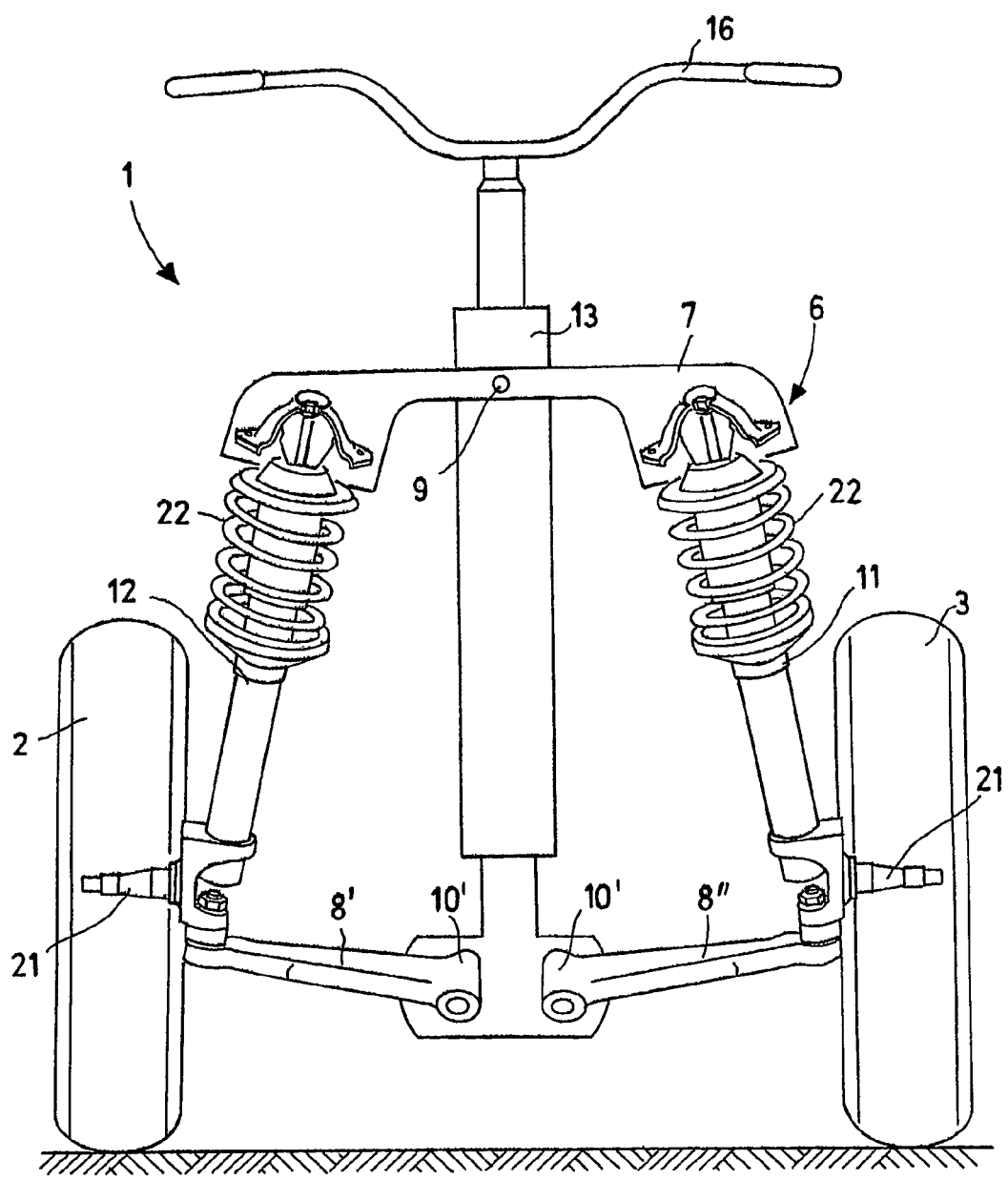

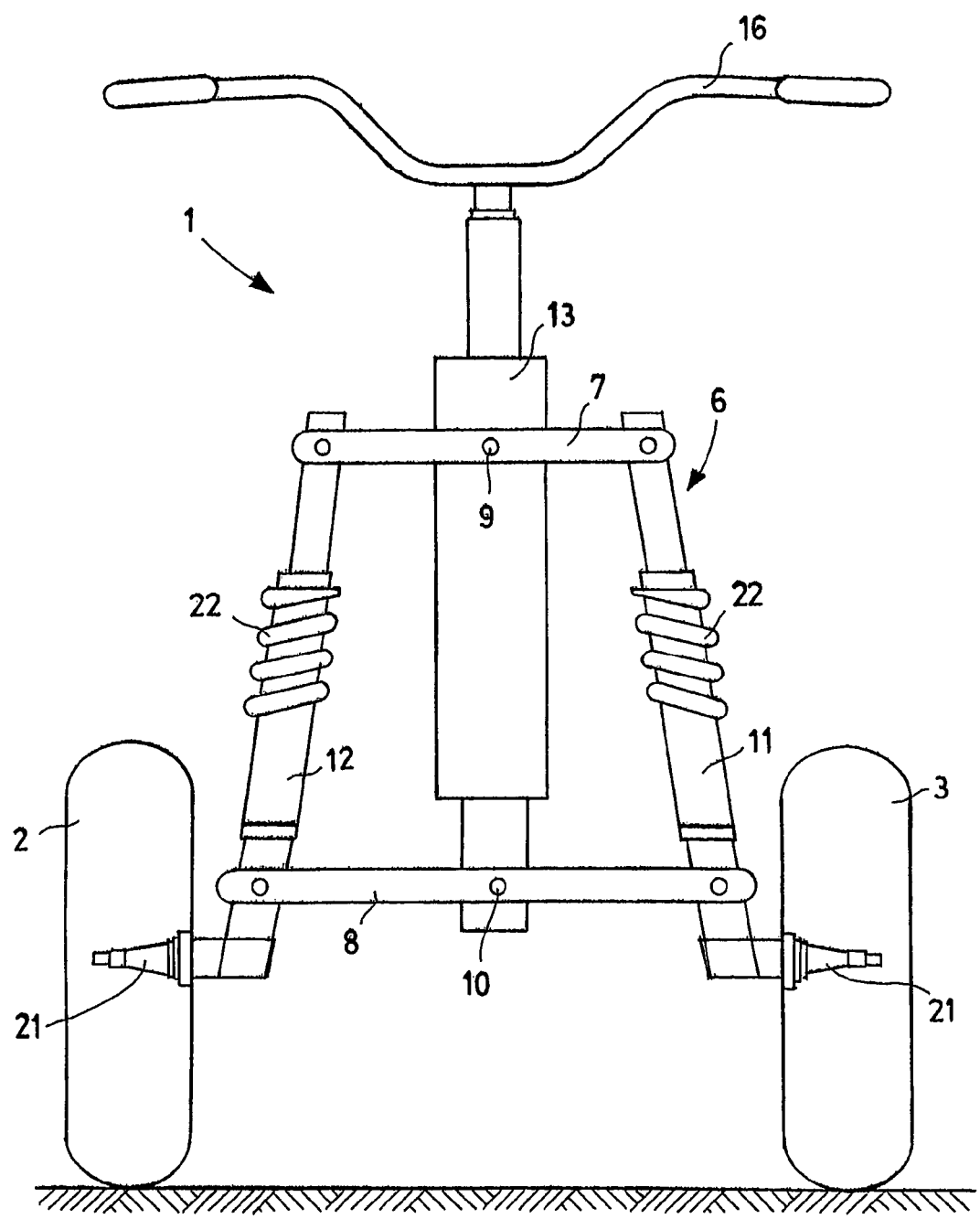
Fig.1 bis

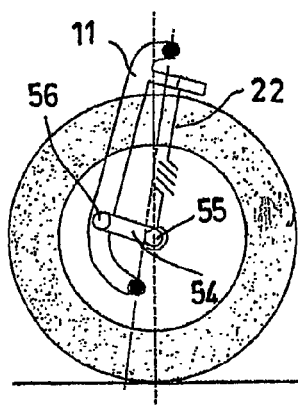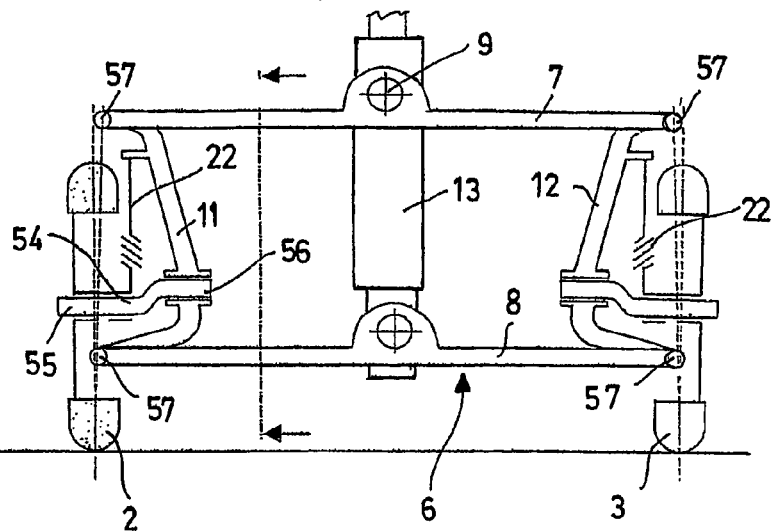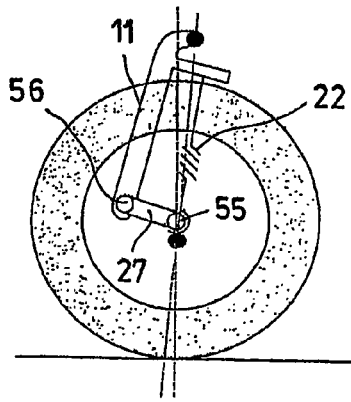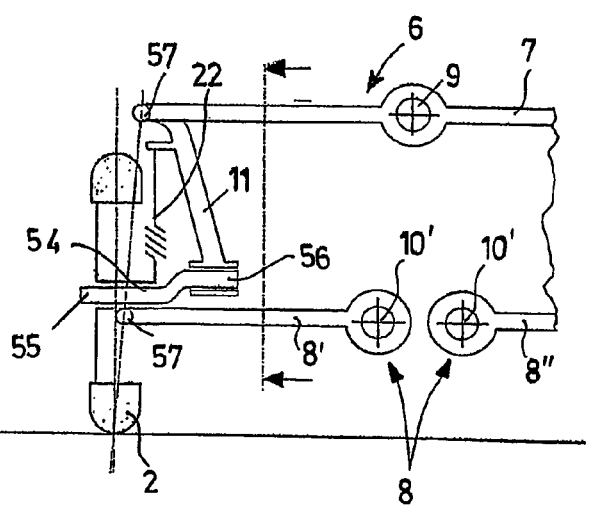

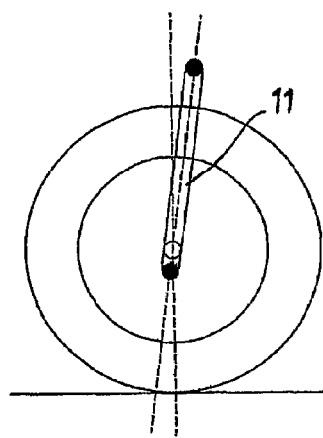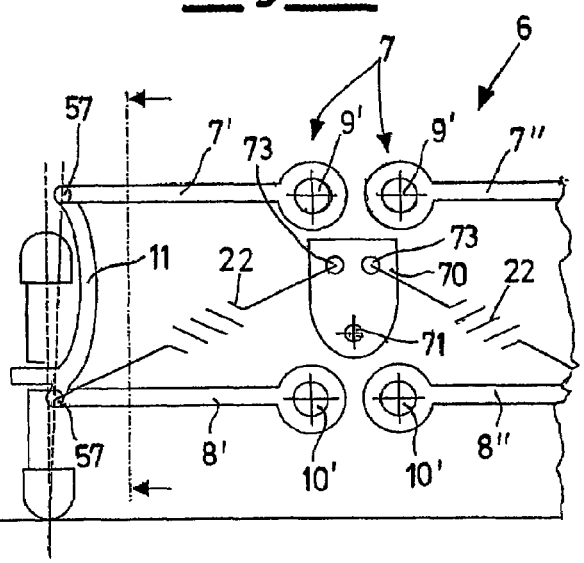

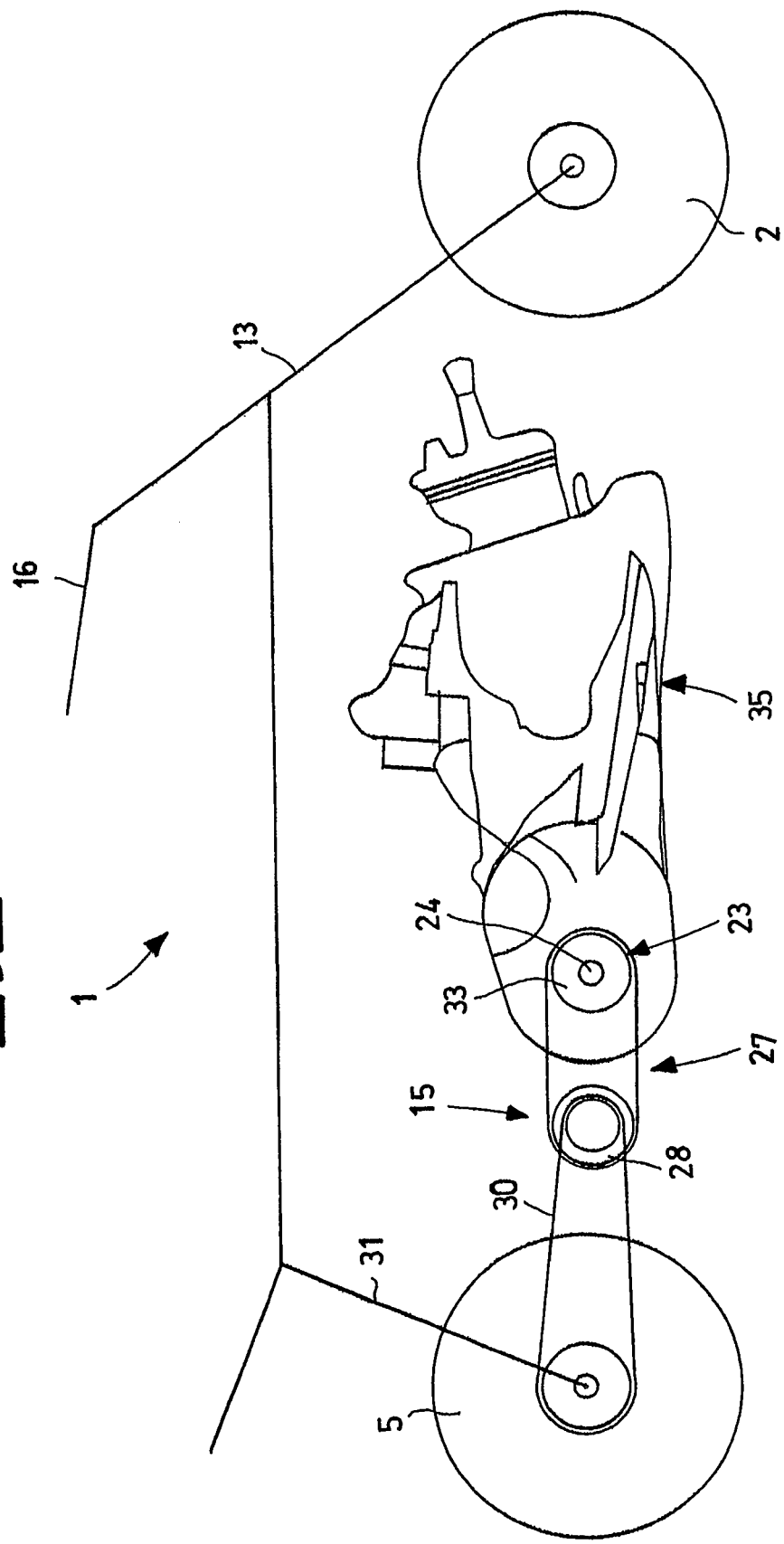

FOUR-WHEELED VEHICLE

The present invention concerns a four-wheeled vehicle.

It is well known that currently in the field of vehicles a substantial diversification of models has gradually been proposed, in particular there is a growing interest towards "hybrid" vehicles that combine the characteristics of motorcycles, in terms of handling, with the stability of four-wheeled vehicles.

Such vehicles are, for example, represented by four-wheeled vehicles known commercially by the name quad (quadricycle) or ATV (All Terrain Vehicle).

Characteristics of this innovative vehicle are mainly an internal combustion engine with automatic gearshift, two or four driving wheels, frame made from steel tubes capable of ensuring the necessary rigidity of the whole thing, independent front suspensions and rear suspensions with the so-called rigid bridge solution with a single shock absorber or, like on some more advanced models, with two independent suspensions.

These vehicles are able to run on any terrain and to climb up the steepest paths. Indeed, with the help of the automatic gearshift, which eases all manoeuvres, this quadricycle with a motor can easily move around in town and on country paths, on impassable obstacles, on stony ground and even on mud and snow.

Such vehicles precisely due to some intrinsic characteristics, such as the rigidity of the vehicle, the very short wheel-base, the low weight and the relatively high barycentre, run the risk, however, above all on the most difficult terrains, of toppling over.

In light of the above, there is clearly a need to be able to provide a four-wheeled vehicle of the aforementioned type that allows the most difficult terrains to be tackled without the risk of toppling over.

Therefore, the purpose of the present invention is that of solving the problems of the prior art providing a four-wheeled vehicle that is reliable and safe and that ensures the stability of the vehicle in any travel condition and terrain.

Another purpose of the present invention is that of providing a four-wheeled vehicle that is simple and cost-effective to produce.

These and other purposes are accomplished by the four-wheeled vehicle according to the present invention that has the characteristics of the attached claim 1.

Further characteristics and advantages of the present invention shall become clearer from the following description, given for illustrating and not limiting purposes, with reference to the attached drawings, in which:

FIG. 1 shows a schematic top front view of the front suspension group of the four-wheeled vehicle according to the present invention;

FIG. 1b is shows a schematic top front view of the front suspension group of another embodiment of the front suspension group of the four-wheeled vehicle according to the present invention;

FIGS. 2a-2b show a schematic view, respectively from the front and from the top side, of a third embodiment of the front suspension group of the four-wheeled vehicle according to the present invention;

FIGS. 3a-3b show a schematic view, respectively from the front and from the top side, of a fourth embodiment of the front suspension group of the four-wheeled vehicle according to the present invention;

FIGS. 6a-6b show a schematic view, respectively from the front and from the top side, of a seventh embodiment of the front suspension group of the four-wheeled vehicle according to the present invention;

FIG. 7 is a schematic top side view from the right of the four-wheeled vehicle according to the present invention;

Figure 4B:
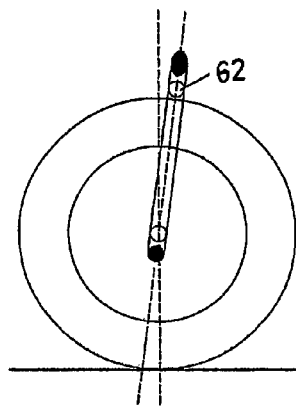
FIGS. 4a-4b show a schematic view, respectively from the front and from the top side, of a fifth embodiment of the front suspension group of the four-wheeled vehicle according to the present invention.

The four-wheeled vehicle, wholly indicated with reference numeral 1, comprises, as indicated in the figures, a frame 13, two steered front wheels 2, 3 and two rear wheels 4, 5 with fixed axis.

The vehicle 1 also has handlebars 16 through which it is possible to act upon the front wheels 2, 3, and a front suspension group 6, based upon an articulated quadrilateral kinematism, which has two respective functions of steering and rolling.

For such a purpose, it is disclosed that the front suspension group 6 is made up of at least two shock absorbers 22, at least two horizontal cross members 7, 8, connected through at least two hinges 9, 9', 10, 10' to said frame 13 and at least two vertical suspension elements 11,12, firmly connected to the two cross members 7,8 so as to form an articulated quadrilateral for the rolling of the vehicle 1.

In the embodiment shown in FIG. 1, the upper cross member 7 is made in a single piece whereas the lower cross member 8 is made in two components or half-arms 8',8".

In detail, in such an embodiment, the upper cross member 7 is connected to the frame 13 through the hinge 9, fixed to the middle of the cross member 7 itself, whereas the components of the lower cross member 8, 8' that each extend from the frame 13 to the respective suspension elements 11, 12, as shown in FIG. 1, are connected to the frame through the hinges 10. Such a solution has been developed so as to completely unlock the two degrees of freedom, so as not to have steering caused by the rolling of the vehicle.

The vertical suspension elements 11, 12 are connected at their ends to the horizontal cross members 7, 8' and 8" through suitable hinge means.

The suspensions 11, 12 are connected at the bottom to the hubs of the front wheels 21 and each comprise a shock absorber 22. In detail, the vertical suspension elements 11, 12 are at least partially integral with a shock absorber 22.

Such a solution has been developed so as to completely unlock the two degrees of freedom, so as not to have steering caused by the rolling of the vehicle. The connection between the two wheels is made so as to ensure kinematically correct steering.

The main purpose of the solution outlined above is that of realising a four-wheeled vehicle equipped with two front steered wheels in parallel, which can be tilted, so as to be able to drive the vehicle 1 like a motorcycle. The front steering system (articulated quadrilateral) can thus roll with respect to the rear part of the vehicle, the front wheels can in turn tilt like the rear wheels, but always remaining in contact with the ground and thus ensuring greater adherence to the road surface.

According to an alternative embodiment, shown in FIG. 1b is, the lower cross member of the articulated quadrilateral is realised in a single component 8 connected to the frame through the hinge 10. The hinge 10 is fixed to the middle of the cross member 8.

On the other hand, in the embodiment shown in FIGS. 2a-2b the upper cross member 7 and the lower cross member 8 are made in a single piece.

The upper cross member 7 is connected to the frame 13 through the hinge 9, fixed to the same middle of the cross member 7, whereas the lower cross member 8 is connected to the frame through the hinge 10. Such a solution has also been developed so as to completely unlock the two degrees of freedom, so as not to have steering caused by the rolling of the vehicle.

The vertical suspension elements 11,12 are connected at their ends to the horizontal cross members 7,8 through suitable hinge means, such as ball joints 57, that are known or in any case that can easily be derived from analogous solutions adopted, for example for two-wheeled vehicles.

The vertical suspension elements 11,12 are connected at the bottom to the hubs of the front wheels 2,3. In detail, the suspension elements 11,12 are connected to the wheel hubs through connecting rods 54 equipped at their ends with cylindrical hinges 55,56.

Each shock absorber 22 is connected to the relative suspension 11 or 12 through two hinges at least one of which is a ball hinge.

Each vertical suspension element 11 or 12 is substantially C-shaped or in any case is arched so as to at least partially surround the front wheel 2 or 3 and reduce the transversal bulk of the vehicle.

This solution allows the articulated parallelogram to be kept rigid in such a way limiting the exchange of forces between the two front wheels.

Advantageously, such an embodiment also allows the mutual independence between the front wheels to be promoted and also allows the influence of the yielding of the suspensions in steering to be limited.

The main purpose of the solution outlined above is that of realising a four-wheeled vehicle equipped with two front steered wheels (2,3) in parallel, which can be tilted, so as to be able to drive the vehicle 1 like a motorcycle. The front steering system (articulated quadrilateral) can thus roll with respect to the rear part of the vehicle, the front wheels can in turn tilt like the rear wheels, but always remaining in contact with the ground and thus ensuring greater adherence to the road surface.

FIGS. 3a-3b show an alternative embodiment of the four-wheeled vehicle according to the present invention that is totally similar to the one illustrated in FIGS. 2a-2b apart from the fact that the lower cross member 8 is made from two components or half-arms 8", 8' and that each end ball joint 57 of the lower cross member 8 is directly integral with the connecting rods 54.

Each half-arm 8', 8" of the lower cross member extends from the frame 13, to which it is hinged through the cylindrical hinge 10', to the respective end joint 57.

This solution has all of the advantages of the solution of FIG. 2a also allowing the bulk inside the wheel rim to be reduced.

Figure 4A:
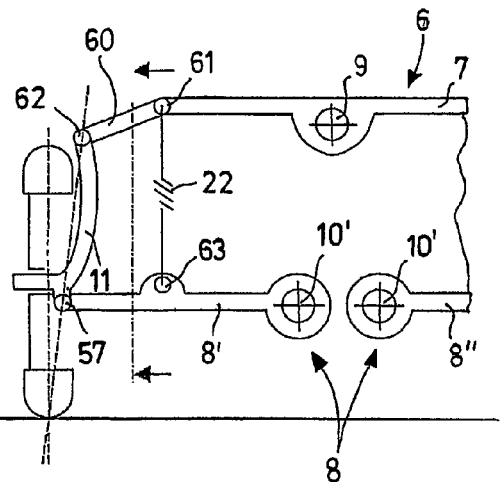

FIGS. 4a-4b show a further embodiment in which the upper cross member 7 is made in a single piece, but it is not directly connected to the vertical suspension element 11 or 12.

In particular, the cross member 7 is connected to the two suspension elements 11 or 12 through the interposition of an upper connecting rod 60 that allows the degrees of freedom of the articulated quadrilateral to be unlocked.

The upper connecting rod 60 is connected to the upper cross member 7 through a cylindrical hinge 61 and to the suspension element through a ball joint 62.

The shock absorber 22 is connected to one of the two half-arms that constitute the lower cross member 8' or 8" through the hinge 63 and to the upper cross member 7 through the hinge 61.

In particular, the hinge 61 that connects the shock absorber to the upper cross member 7 is a cylindrical hinge and it is this hinge that allows the hinging between the cross member 7 and the upper connecting rod 60.

The hinge 63 that connects the shock absorber to one of the half-arms 8' or 8", on the other hand, is a cylindrical hinge arranged in a seat made on the same lower half-arm.

Figure 5B:
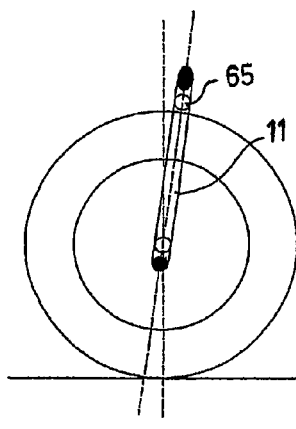
FIGS. 5a-5b show a schematic view, respectively from the front and from the top side, of a sixth embodiment of the front suspension group of the four-wheeled vehicle according to the present invention.
Figure 5A:
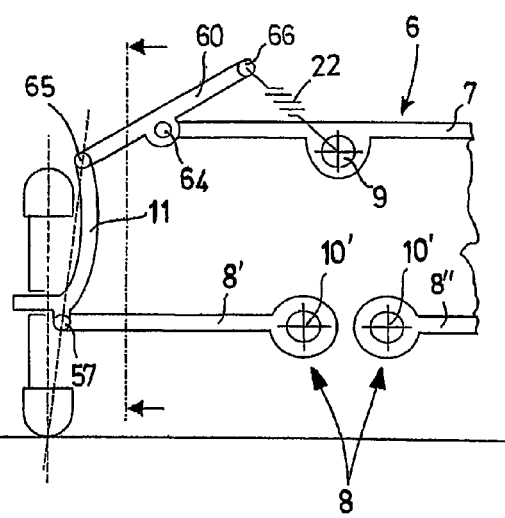

In FIGS. 5a-5b another embodiment of the present invention is shown.

Also in this embodiment the cross member 7, made in a single piece, is connected to the two vertical suspension elements 11,12 through the interposition of an upper connecting rod that allows the degrees of freedom of the articulated quadrilateral to be unlocked.

In this case, the connecting rod 60 is pivoted, through a cylindrical hinge 64 to the cross member 7 and through a ball joint 65 to the vertical suspension element 11 or 12.

At the opposite end to the one hinged with the vertical suspension element 11 or 12, the upper connecting rod 60 has a cylindrical hinge 66 that allows the connection between the upper connecting rod 60 and the shock absorber 22.

The shock absorber 22 is also connected at 9 to the middle of the cross member 7 and consequently to the frame 13.

According to this arrangement the shock absorbers 22 work in a substantially horizontal position, for such a reason requiring a specific solution.

This embodiment allows all of the articulations to be housed inside the wheel.

Finally, in FIGS. 6a-6b a further embodiment of the four-wheeled vehicle according to the present invention is shown in which both of the cross members, upper 7 and lower 8 respectively, are made in two pieces or half-arms.

Each half-arm 7',7",8',8" is directly connected through ball joints 57 to the vertical suspension elements 11,12.

An oscillating plate 70 is also foreseen hinged, by means of a cylindrical hinge 71, to the frame 13 so as to be able to rotate around the latter.

The oscillating plate 70 can substantially rotate in a plane at the front of the vehicle, to allow the correct operation of the suspension group 6.

For such a purpose, the plate 70 is hinged, through suitable hinges 72, such as two cylindrical hinges 73, to the shock absorbers 22.

Each shock absorber 22 is then connected to the vertical suspension element 11 or 12 at the ball joint 57.

Also in this case, the vertical suspension elements 11,12 have an arched shape suitable for partially surrounding the front wheel; in this way the half-arms of the quadrilateral 7',7", 8', 8", which constitute the cross members 7 and 8, are arranged on a plane very close to the middle plane of the front wheels so as to minimize the effects of variation in roadway during cornering.

From the kinematic point of view, it should be noted that with this scheme, both during cornering and during squashing of the suspensions, the two front wheels move, with respect to the frame 13, remaining parallel with each other.

The four-wheeled vehicle 1 according to the present invention also has a rear suspension group 14, a traction transmission system and a coupling system between the frame 13 and the engine unit 35 of the vehicle suitable for dampening the vibrations between the engine unit 35 and the frame 13.

The engine unit 35, for such a purpose, is connected to the frame 13 by means of two rear connection groups 23 and a front connection group.

The front connection group is not outlined in detail since it can be identical to any known solution for two-wheeled vehicles.

Figure 8:
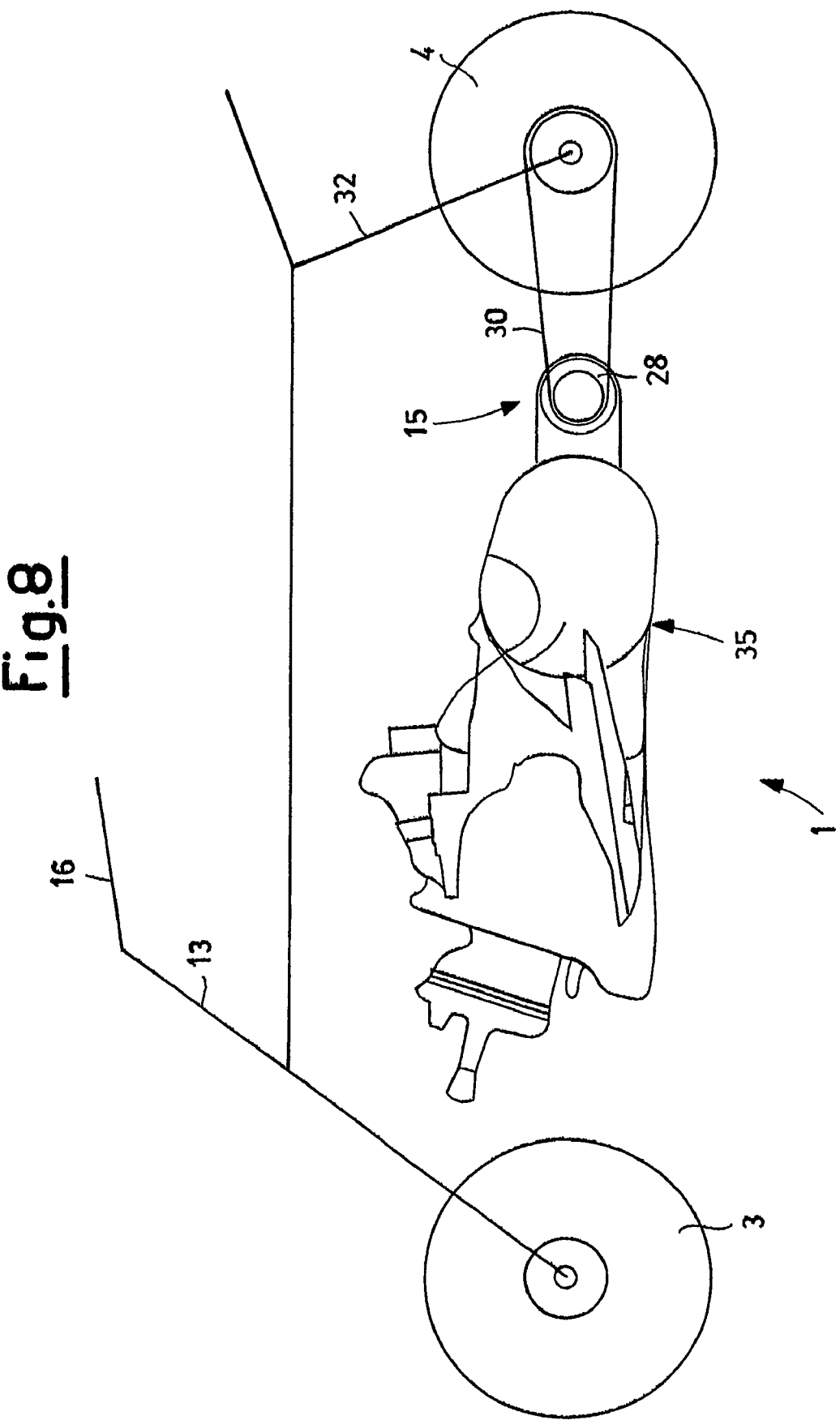
FIG. 8 is a schematic top side view from the left of the four-wheeled vehicle according to the present invention.
Figure 9:
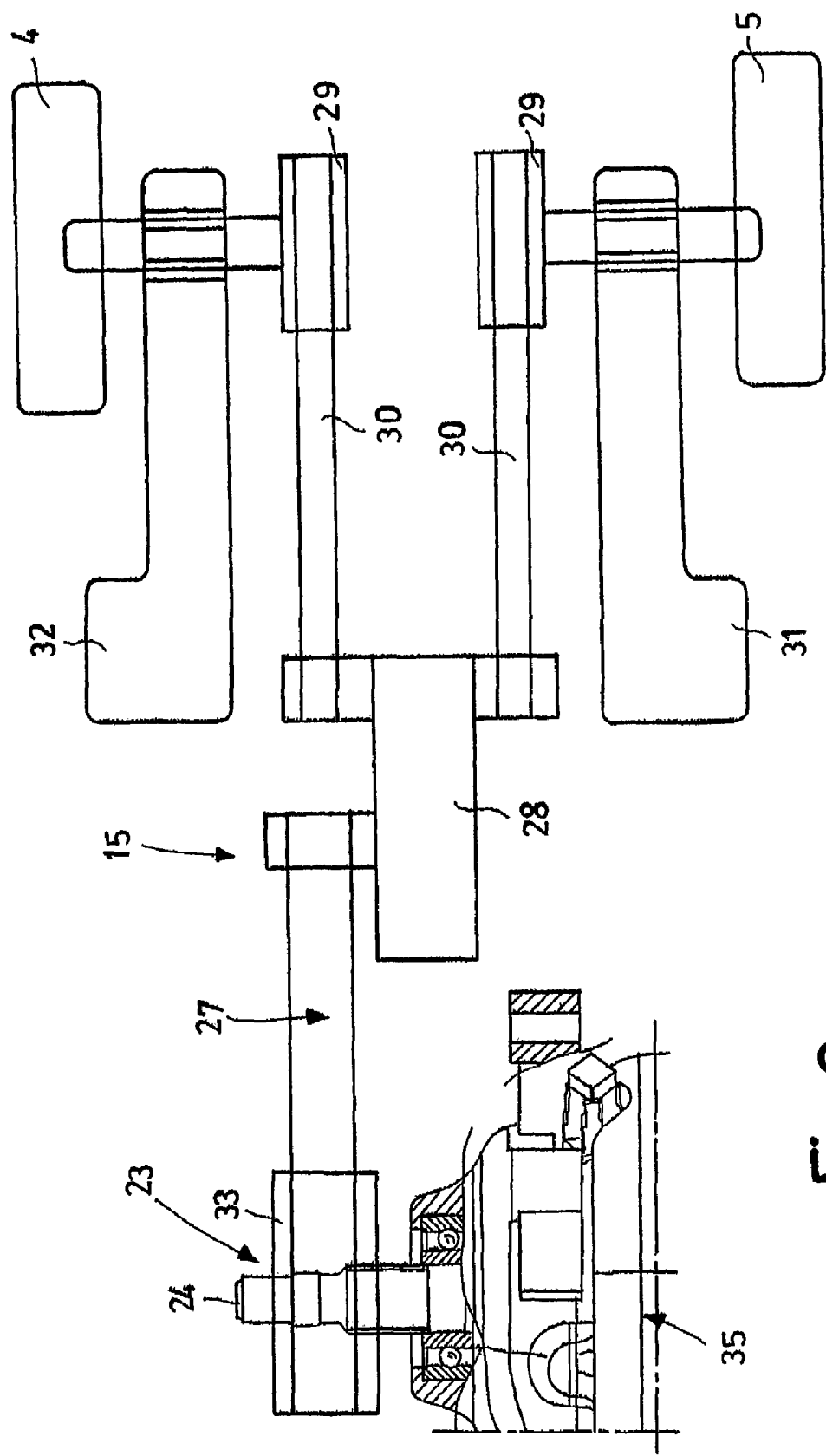
FIG. 9 is a schematic view from below of the traction transmission system of the four-wheeled vehicle according to the present invention.

The rear connection groups 23, of which only one is shown in FIGS. 7-9, are arranged on the side of the crankcase of the engine unit 35 in a corresponding position, but on opposite sides of the crankcase.

As shown in FIGS. 7 and 8, thanks to the rear connection groups 23, the engine unit 35 is positioned with respect to the motor vehicle, in a central position. More specifically, the engine unit 35 is positioned at the central part of the vehicle 1, in such a way reducing the formation of twisting torques due to an increase in the distance between point of application of the weight force of the engine unit 35 and the centre of mass of the vehicle.

In such a way a vehicle is obtained with a more compact structure and therefore less subject to possible turning moments.

A connection group 23, as can be seen more clearly in FIG. 9, is arranged at the side of the crankcase of the engine unit 35 at the drive shaft 24, whereas the remaining connection group 23 (not shown) is arranged again at the drive shaft 24, but on the opposite side of the crankcase.

In particular, a connection group 23, the one shown in FIGS. 6, 7 and 8, is fitted directly onto the drive shaft 24.

On the opposite side of the crankcase, in a corresponding position, as stated previously, the other connection group 23 is arranged firmly attached to the engine unit 35 by means of a projecting pin (not shown), integral with the crankcase.

Each rear connection group 23 comprises a roller and a silentblock.

The roller is the mechanical member used for the connection between the silentblock and the drive shaft 24 or the pin projecting from the crankcase whereas the silentblock, really responsible for the dampening of vibrations, at least partially contains the roller and is firmly attached to it by means of a forced coupling, either by welding or another coupling system.

In an alternative embodiment, the connection groups 23 can be formed just from silentblocks or just from rollers.

The connection groups 23 are, in turn, coupled with support brackets fixed to the frame 13 so as to allow exclusively movements of the engine unit 35, substantially in the vertical plane.

The coupling system between engine unit and frame, described above, allows the transmission to the vehicle of oscillations and vibrations generated by the acceleration of the engine to be eliminated. Such a system also allows the engine unit 35 to be integral with the frame, whereas transmission and suspension arm move separately.

For such a purpose, the rear suspension group 14 comprises two suspensions 31, 32 with independent longitudinal arms.

The transmission of traction from the output of the drive shaft 24 to the rear wheels 3, 4 takes place through a first drive chain 27, engaged on a first sprocket 33 fitted directly upon the drive shaft 24. Indeed, the drive chain 27 acts upon a differential 28 that, by means of second drive chains 30 and suitable second sprockets 29, transfers the movement both to the left rear wheel 3 and to the right rear wheel 4.

The present invention has been described for illustrating, but not limiting purposes, according to its preferred embodiments, but it should be understood that variations and/or modifications can be brought by men skilled in the art without for this reason departing from the relative scope of protection, as defined by the attached claims.

The invention claimed is:

1. Four-wheeled vehicle (1) with two steered front wheels (2, 3) comprising a frame (13), handlebars (16), two rear wheels (4, 5) and a front suspension group (6) that acts upon said two front wheels (2, 3) characterized in that said front suspension group allows the roiling of the vehicle and comprising at least two shock absorbers (22), at least two horizontal cross members (7,8) comprising at least one lower cross member and one upper cross member connected through at least two hinges (9,9',10,10') to said frame (13) and at least two vertical suspension elements (11,12) firmly connected to said at least two horizontal cross members (7,8) so as to form an articulated quadrilateral for the rolling of the vehicle (1), said horizontal cross members (7,8) are connected at their ends to said vertical suspension elements (11, 12) through hinge elements (57) wherein said front suspension group (6) also comprises at least two cylindrical hinges (66) to connect connecting rods (60) to said shock absorbers (22) where said shock absorbers (22) are also connected to said middle of the upper cross member (7) through said hinge (9).

2. Four-wheeled vehicle (1) according to, claim 1 characterized in that at least one of said horizontal cross members (7,8,8') is made in two elements (8,8') connected to said frame (13).

3. Four-wheeled vehicle (1) according to claim 1, characterized in that each of said vertical suspension elements (11, 12) has an arched shape suitable for at least partially surrounding said front wheel (2 or 3) to reduce the transversal bulk of said vehicle (1).

4. Four-wheeled vehicle (1) according to claim 3, characterized in that said lower cross member (8) comprises two half-arms (8',8"), each half-arm (8',8") extending from a central hinge (10',10') to an end hinge (57).

5. Four-wheeled vehicle (1) according to claim 4, characterized in that said connecting rods connect said upper cross member (7,8) to each vertical suspension element (11,12).

6. Four-wheeled vehicle (1) according to claim 5, characterized in that said front suspension group (6) also comprises rods at least one ball joint (62) to connect said connecting rods (60) to said vertical suspension elements (11,12).

* * * * *